United States Patent [19]

Frick et al.

[11] Patent Number: 5,087,937
[45] Date of Patent: Feb. 11, 1992

[54] PHOTOELECTRIC SCANNER

[75] Inventors: Beat Frick, Buchs; Walter Kraft, Zurich; Karl Ursprung, Niederhasli, all of Switzerland

[73] Assignee: Gretag Systems, Bothell, Wash.

[21] Appl. No.: 578,571

[22] Filed: Sep. 7, 1990

[30] Foreign Application Priority Data

Sep. 7, 1989 [CH] Switzerland ............... 3244/89

[51] Int. Cl.$^5$ ................................................ G03B 27/00
[52] U.S. Cl. ................................................ 355/1
[58] Field of Search .................. 355/1, 38; 350/96, 25; 358/302; 382/65, 67

[56] References Cited

U.S. PATENT DOCUMENTS

| | | | |
|---|---|---|---|
| 2,300,970 | 11/1942 | Riess et al. | |
| 3,676,641 | 7/1972 | King et al. | 355/83 |
| 3,677,641 | 7/1972 | King et al. | 355/83 |
| 3,944,362 | 3/1976 | Dailey | 355/38 |
| 4,061,428 | 12/1977 | Amano et al. | 356/175 |
| 4,082,465 | 4/1978 | Bicki et al. | 356/203 |
| 4,188,125 | 2/1980 | Barbieri et al. | 355/38 X |
| 4,352,550 | 10/1982 | Uchida | 355/1 X |
| 4,472,046 | 9/1984 | Kohyama | 355/1 |
| 4,564,866 | 1/1986 | Comberg | 350/96.25 X |
| 4,748,680 | 5/1988 | Margolin | 355/1 X |
| 4,760,421 | 7/1988 | Margolin | 355/1 |
| 4,873,546 | 10/1989 | Zahn et al. | 355/38 |
| 4,933,710 | 6/1990 | Beaulieu et al. | 355/38 |
| 4,951,084 | 8/1990 | von Stein et al. | 355/38 |
| 4,975,728 | 12/1990 | Gordon | 355/1 |
| 4,975,729 | 12/1990 | Gordon | 355/1 |

FOREIGN PATENT DOCUMENTS

| | | |
|---|---|---|
| 312499 | 4/1989 | European Pat. Off. |
| 2459456 | 12/1974 | Fed. Rep. of Germany |
| 3737775 | 5/1989 | Fed. Rep. of Germany |
| 2621710 | 10/1987 | France |
| 637223 | 7/1983 | Switzerland |

OTHER PUBLICATIONS

European Search Report RS 84953 CH.
European Search Report RS 84940 CH.
European Search Report 8566CH.

*Primary Examiner*—Richard A. Wintercorn
*Attorney, Agent, or Firm*—Burns, Doane, Swecker & Mathis

[57] ABSTRACT

The light emitted by a source of light is passed by means of optical fibers or bundles of optical fibers in lines over a master to be scanned. In the process, an orifice of a disk rotated by a motor sequentially projects the light onto one optical fiber or bundle of fibers leading to the master. The light exiting from the light emitting end of the optical fiber or bundle of optical fiber illuminates the master. On the other side of the master a corresponding optical fiber or bundle of fibers receives the light coming from the master and conducts it to a receiver.

13 Claims, 2 Drawing Sheets

PHOTOELECTRIC SCANNER

BACKGROUND OF INVENTION

The invention concerns a photoelectric scanner for scanning a transparent master.

Scanners of this type make possible the automatic analysis of the color composition in particular of copy masters. A scanner of this type is known for example from U.S. Pat. No. 3,944,362. In the scanner described therein the copy master in the form of a film is exposed to light from a source of light, after the light has been scattered by a diffusor. Following its passage through the film, the light enters an optical fiber. The light exiting from the optical fibers at the other end impacts a rotating disk having an orifice. The orifice in the course of its rotation releases in succession the light exiting from the individual optical fibers, which is detected.

Another scanner is known from FR-OS-2 621 710. In the case of the scanner described therein part of the light coming from a source of light impacts an optical fiber after passing through a filter located in an orifice of a rotating filter wheel. Following its exit from the other end of the optical fiber, the light passes through a diffusor and impacts a copy master in the form of a film. After passing through the film, the light enters other optical fibers, which lead to photocells. Another part of the light from the source of light is guided to a photosensitive paper.

A further scanner is known from DE-OS-24 59 456. In the scanner described therein, the scanning light coming from a source of light is guided over the film (copy master) by reflection from the mirror surfaces of a motor driven mirror wheel transversely to the longitudinal direction of the film.

Another scanner is known from DE-OS-26 27 694. In the case of this scanner the light of the light source travels through a diffusor and impacts the copy master in the form of a film. The light passing through the film is received by optical fibers whose light incident surfaces are located transversely to the transport direction, over the film. The light emission surfaces, i.e., the other ends of the optical fibers, are placed on a circle. The optical fibers are faced by a rotating disk comprising at least three windows in which filters for the colors red, green and blue are located. The scanner contains photoelectric converters to receive the light exiting from the light emission surfaces and passing through the filters of the rotating disks. The scanner further has two measuring or detecting devices: a first device to determine the rotating position of the rotating disk, with the first detection device providing a signal whenever a filter of a predetermined color is located in front of the light emission surfaces, and a second device to issue a command for the measurement of density whenever the filter of any color is located in front of the light emission surfaces.

Scanners of this type are used for example in high capacity printers. In the case of another known scanner used in such applications a light source projects a beam of light onto a circular disk, which rotates at a short distance parallel to the copy master and contains orifices to define a point to be scanned on the copy master. The light coming from the copy master is received by a detection unit.

The trend in the scanning of copy masters tends toward higher and higher resolutions. This increasingly requires smaller and more numerous scanning points per copy master, which in turn and in different ways requires greater capacities of the detectors and of the evaluating electronics. On the one hand, the scanning time per point must be as short as possible, as the number of points in the case of higher resolutions is higher, and on the other, the minimally detectable light intensity must be lower, since with identical light intensities in the scanning point but with smaller dimensions of said point, the quantity of the light impacting the detector will be correspondingly smaller. In the aforementioned scanners the light is initially scattered by a diffusor and then impacts the copy master. If by subsequent measures the dimensions of the scanning points are reduced, a loss of light power always follows. This renders the detection of the scanning light considerably more difficult.

SUMMARY OF THE INVENTION

In view of this, it is the object of the invention to increase the light intensity in a point of reduced dimensions, in order to obtain a higher light intensity in the receiving point, thereby simplifying detection.

BRIEF DESCRIPTION OF THE DRAWINGS

Other objects and advantages of the present invention will become more apparent from the following detailed description of preferred embodiments as described with reference to the drawings in which.

DETAILED DESCRIPTION OF THE PREFERRED EMBODIMENTS

Figure 1:
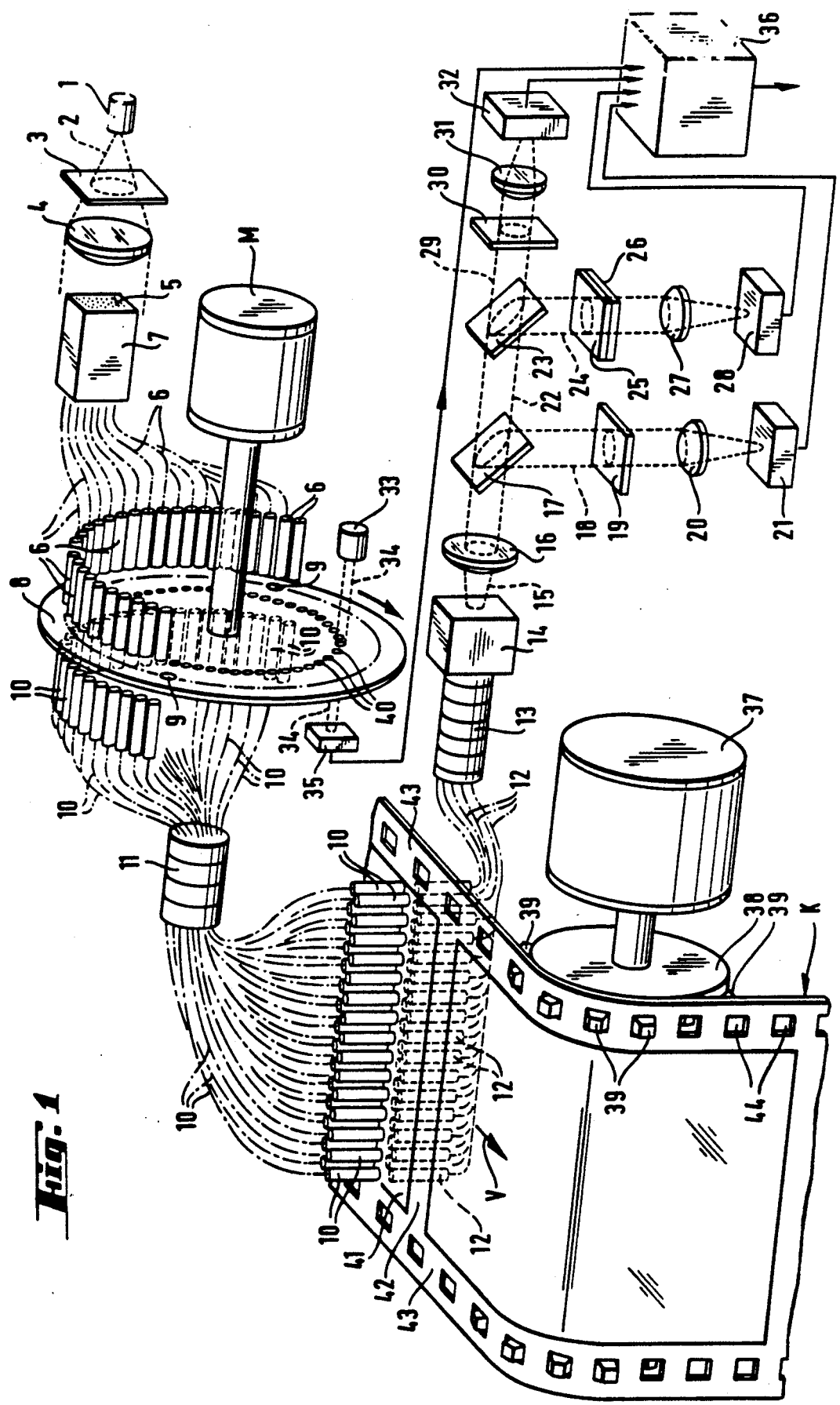
FIG. 1 shows in a schematic perspective an example of a scanning apparatus according to the present invention.

According to FIG. 1, the apparatus has a light source 1, a heat protection filter 3, a condenser lens 4, optical fibers or fiber bundles 6, 10 and 12, a disk 8 with orifices 9, driven by the motor M, and a receiving unit. The receiving unit in turn comprises a condenser 16, two interference mirrors 17 and 23, three absorption filters 19, 25 and 30, a heat protection filter 26, three detector lenses 20, 27 and 31 and three detectors 21, 28 and 32. The apparatus further contains another light source 33 and an electronic device 36, a motor 37 and a transport roller 38.

The divergent beam 2 emitted by the light source 1 passes through the heat protection filter 3, which reduces the excessive proportion of the red light in the beam 2. The beam 2 is focused by the condenser lens 4 onto the front side of the lead-in fibers or fiber bundle 6. In the process, as much as possible of the quantity light emitted by the light source 1 is to be passed into the lead-in fibers or fiber bundle 6 (the terms "one fiber" or "fibers" is intended hereinafter to also signify one or several bundles of fibers in place of one fiber or several fibers). The lead-in fibers 6 terminate in the immediate vicinity of the disk 8, driven by the motor M and rotating around its center, and are approximately perpendicular to said disk 8. The disk 8 near its periphery has two orifices 9 diametrically opposed to each other. The ends of the fibers 6 are located in equidistance spacing in an 180° sector as close as possible to the circular path of the orifices 9.

On the other side of the disk 8, another optical fiber 10 terminates coaxially relative to the end of each fiber 6, again at a slight distance from the disk 8 and approximately perpendicular to it. The orifices 9 of the disk 8 then release the light exiting from the end of the fibers 6 onto the coaxial light receiving fibers 10, in a manner such that after one orifice has released the light sequentially onto the individual fibers 10 during one-half revolution of the disk 8, the other orifice releases the light sequentially onto the individual fibers 10 during the other one-half revolution of the disk 8. In this manner, all of the ends of the fibers 10 are exposed to the light at double the frequency of the rotation of the disk 8. The fibers 10 lead to the plane of the master K and terminate at a slight distance from said plane and perpendicularly to it. The fiber ends are located in equidistant spacing along the scanning line or scanning lines. The light exiting from each of the fiber ends illuminates the master K concentrated in a spot (scanning point), with a fiber 10 being associated with each of the scanning points. The master, for example in the form of a film K, is being passed in the meantime over a transport roller 38, which, driven by a motor 37, moves the film K in the direction of advance V.

Each end of an optical fiber 10 is correlated on the other side of the film K with a corresponding end of a take-off optical fiber 12 located coaxially with the end of the fiber 10. The ends of the take-off fibers 12 are again located at a slight distance from the plane of the film K and perpendicular to it. The fiber ends receive the light coming from the scanning point and conduct it for example via a plug connection to a receiving unit, which is described below as an example. Alternatively to the apparatus described above, the disk 8 may also be located in a break of the take-off fibers 12.

The receiving unit comprises three essentially similar receiving and detecting layouts, one each for the frequency band of the blue, red and green light, each of them containing an absorption filter 19, 25 and 30, a detector lens 20, 27 and 31 and a detector 21, 28 and 32. For the frequency band of the red light a heat protection filter 26 is provided additionally; it follows the absorption filter 25 directly. To separate the individual frequency bands, the receiving and detection unit contains two interference mirrors 17 and 23, located at an approximate angle of 45° relative to the axis of the beam 22 coming from the copy master and the beam 29 passed by the first mirror 17.

The beam 15 coming from the film K impacts the first interference mirror 17 through the lens 16. The mirror coarsely filters from the spectrum the frequency band of the blue light, by reflecting the blue light and allowing the other spectral components to pass. The coarsely filtered blue light 18 passes through an absorption filter 19, which filters a finer band from the coarsely filtered band, and to the detector 21 via a detector lens 20. The beam 22 passed by the mirror 17 and reduced by the frequency band of the blue light, impacts a second interference mirror 23, which coarsely filters the frequency band of the red light 24 from the remaining spectrum by the same principle as the mirror 17. This red light, filtered out by reflection, impacts a second absorption filter 25, which filters a finer band from the coarsely filtered band, which, after passing through a heat protection filter 26, is imaged by a detector lens 27 on the corresponding detector 28. The beam 29 passed by the mirror 23, diminished by the frequency bands of the blue and the red light, passes through a third absorption filter 30, which filters from the remaining spectrum the frequency band of the green light and reproduces it via a detector lens 31 on the corresponding detector 32.

The signals generated by the detectors 21, 28 and 32 are passed to an electronic device 36. It is the function of the electronic device 36 to evaluate the signals coming from the detectors 21, 28 and 32 of the receiving unit. For this, it must receive information relative to at what point in time the signals passed to it from the detectors 21, 28 and 32 are to be measured, i.e., a cycling signal. Such a cycling signal is generated by providing a source of light located near the disk 8 which emits a beam 34, which impacts the disk 8, which in addition to the orifices 9, has other orifices 40, located in an equidistant spacing, at a smaller distance from the center of the disk than the orifices 9, over the entire periphery of a circle. The orifices 40 are located so that whenever an orifice 9 is located exactly between the ends of the fibers 6 and 10 facing the disk 8, the orifices 40 release the beam 34 onto the detector 35. The detector 35 converts the optical signal received into an electrical signal. The electric cycle signal obtained in this manner is conducted to the electronic device 36.

As mentioned above, the term "fiber" is also used to indicate a bundle of fibers. As the flexibility of optical fibers decreases with increasing diameters, usually fiber bundles, in which numerous individual thin optical fibers (for example 50 μm individual diameters) are surrounded by sheathing (for example PVC) which keeps the bundle together and protects it against external effects, are used instead of larger fibers.

For simplicity and clarity of representation only a few of the "fibers" 6, 10, and 12 are shown in FIG. 1. In actual practice about 20 to 50 such bundles are used. The fiber bundles, except in locations where they are interrupted, are combined in cables 7, 11, 13, which sheathe the bundles together. The ends of the optical fiber bundles 6 are distributed for example over the cross section surface of a cable 5 surrounding the fiber bundles 6, into which the light is introduced. The light emitting ends of the bundles 6 are inserted—as are the light receiving coaxial ends of the bundles 10 beyond the disk 8—into openings of a plate parallel to the disk 8 and ground flat. The width of the gap between the plates is about 1.2 mm. The fiber bundles 10 guide the light to the plane of the film K. As commercial fiber bundles have diameters of about 1 mm and more, and the image field of a 135 film (24 mm × 36 mm film) is to be resolved into approximately 1000 scanning points with about 30 scanning points per line, the bundles cannot be arranged along a single line. In order to nevertheless obtain the high resolution desired, the light emitting ends of the fiber bundles 10 are located along two adjacent, parallel lines and are spaced apart alternatingly when viewed in the direction of advance V. The sequence of the bundle ends on the film K is in agreement with the sequence of the bundle ends on the disk 8, so that a scanning pattern is obtained, such as the one shown in FIG. 2 and explained below. The scanning point moves in a zig-zag fashion from one end of the double line to the other. It is also possible to move the scanning point in a different pattern over the film K; in such a case the electronic device 36 must receive information making possible the unambiguous correlation of every scanning signal with each image point. Beyond the film K, the light receiving ends of the fiber bundle 12 are located coaxially relative to the light emitting ends of the fiber bundle 10. The ends of both fiber bundles 10 and 12 at the film K are inserted—as are the ends at the disk 8—into openings of a plate parallel to the plane of the master and are ground flat. The width of the gap between the plates in which the film K is transported, amounts to about 1.8 mm. The bundles 12 guide the light coming from the scanning points via a plug connection 14 to a spectrometer.

The diameter of the optical fiber bundles 6, 10 and 12 decreases after each interruption of the bundles in the direction of the flow to the receiver. The fiber bundles 6, into which the light coming from the light source 1 is introduced to the disk 8, have a diameter of 1.65 mm, the bundles 10 a diameter of about 1.16 mm and the bundles 12 a diameter adapted to the detector surface of only 0.4 mm. By the gradual reduction of the diameter of the optical fiber bundles the luminous density is maintained and detection facilitated.

Figure 2:
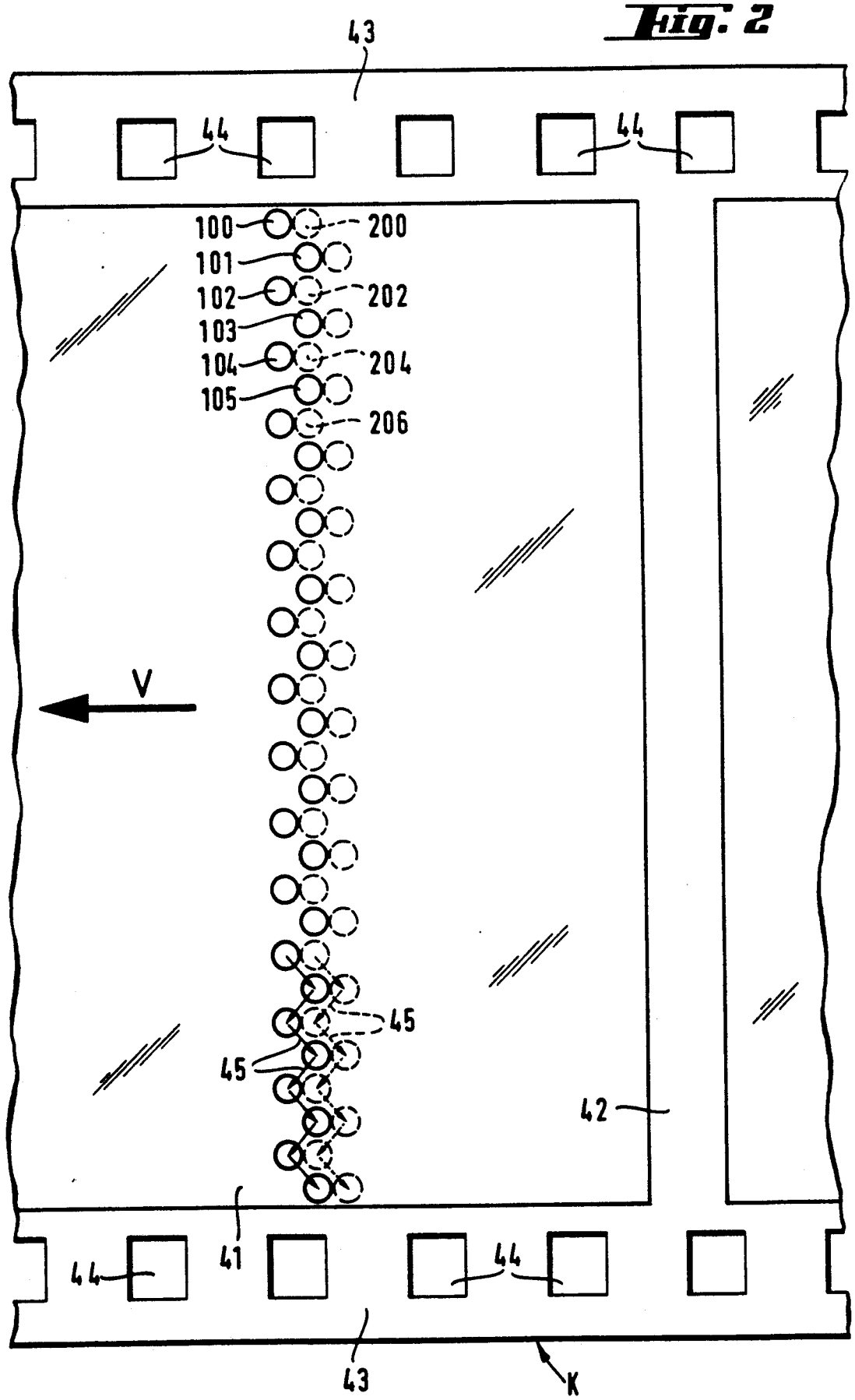
FIG. 2 shows a top elevation of a master to be scanned.

The mode of operation of the scanner shown may be seen in FIG. 2, which shows a top view of a piece of a film K, having image fields 41 separated by webs 42 and equipped with edge perforations 44. During scanning, the scanning light point 100, 101, 102, 103, etc. moves over the image field 41 along a double line transversely to the direction of advance V of the film strip. The motion takes place in a zig-zag manner between two adjacent lines as indicated by the arrows 45. In the subsequent scanning of the next double line the unscanned intervals 200, 202, 204, 206, etc. generated during the preceding scanning by the zig-zag shaped alternation of the scanning point between two lines, are scanned. In actual fact therefore a single image line is thus composed of the sum of two subsequent double line scans. In one line therefore the totality of the circles 101, 103, 105, etc. and of the broken line circles 200, 202, 204, etc. corresponds to the resolution of a line into individual scanning points. By combining several individual lines, a nearly square grid of for example 1 mm × 1 mm may be obtained. In actual practice the grid is not exactly square, as the motor 37 moves the film continuously and therefore the lines are not exactly perpendicular to the direction of advance V. However, the velocity of the point of light is very high relative to the transport velocity, so that deviations from the "optimal" geometry are very small.

The formation of an image from individual scanning points is carried out by a computer program, which takes into account the sequence of the generation of the scanning points. In actual practice (for example in photoprinters) in most cases the scanned values of several successive images are stored and called up prior to the subsequent exposure for the computation of the quantity of light required and for the control of the color shutters, image by image.

As mentioned above, the scanning apparatus described is especially suitable for use in copy machines.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. Photoelectric scanner for scanning a transparent master, comprising a light source, a first light conducting means disposed between said light source and the plane of said master and formed by optical fibers or bundles of optical fiber having light emitting ends disposed along a plurality of scanning lines at a slight distance from and approximately perpendicular to the plane of the master, the light emitting end of each optical fiber or fiber bundle corresponding to a scanning point, for guiding the light emitted by said light source line by line over said master to be scanned and detected by a receiver disposed behind said master.

2. Scanner according to claim 1, wherein the light emitting ends of said first optical fiber or fiber bundles are disposed along a first side of a plane of said master in a manner such that said scanning points form two adjacent, parallel lines across said master, with alternating gaps, when viewed perpendicularly to the direction of the lines.

3. Scanner according to claim 2, wherein a second light conducting means is disposed on a second side of the plane of said master for collecting light coming from said first optical fibers or fiber bundles through said master and conveying said light to the light receiver, said second light conducting means being formed by optical fibers or fiber bundles having their light receiving ends disposed coaxially relative to the light emitting ends of said first optical fibers or fiber bundles.

4. Scanner according to claim 1, wherein said first optical fibers or fiber bundles and second optical fibers or fiber bundles are separated by a gap, in which a circular disk rotating around its center is disposed, said disk having at or near its periphery at least one orifice, and wherein the ends of said first and second fibers or fiber bundles in front and behind said disk are disposed equidistantly spaced along the circular path of said orifices in pairs, coaxially relative to each other, at a distance from and perpendicularly to said disk, such that light passing from said first fibers or fiber bundles to said second fibers or fiber bundles intersects the circular path of the orifice or orifices.

5. Scanner according to claim 4, wherein the ends of the fibers or fiber bundles adjacent the disk are disposed spaced along the circular path of said orifices in the same sequences as said fibers or fiber bundles are disposed adjacent the plane of said master along said scanning lines.

6. Scanner according to claim 5, wherein the ends of the fibers or bundles of fibers along said two adjacent, parallel lines in the plane of said master are disposed in a manner such that every other fiber or fiber bundle in sequence is correlated with the points of one line, and every fiber or fiber bundle thereinbetween is correlated with points of the other line, and such that the fibers or fiber bundles in sequence form a zig-zag pattern formed from every other point of each of said two lines.

7. Scanner according to claim 6, wherein the disk comprises a total of n diametrically opposed orifices and wherein the entire layout of coaxial fiber or fiber bundle ends are restricted to a sector of 360°/n.

8. Scanner according to claim 3, wherein the diameter of the optical fibers or bundles of optical fibers becomes smaller after each interruption of the fibers or fiber bundles in the direction of flow.

9. Apparatus according to claim 3, wherein most of the optical fibers or bundles of optical fibers leading to the master and/or the light receiving optical fibers or bundles of optical fibers coming from the master are combined into cables 10. Apparatus according to claim 3, wherein said second optical fibers or bundles of fibers are passed to a single common receiver.

11. A photoelectric scanner for scanning a transparent master comprising:
- a light source;
- a light conducting means comprising a first plurality of optical fibers arranged perpendicular to a plane of the transparent master and having light emitting ends for guiding light emitted from the light source to said transparent master, said light emitting ends being arranged in a plurality of adjacent, parallel lines for emitting light directly onto said master at a plurality of adjacent, parallel scanning points; and
- a receiving means disposed opposite said light emitting ends for receiving light transmitted through said master at each scanning point.

12. Photoelectric scanner for scanning a transparent master according to claim 11, wherein said receiving means further comprises:
- a second plurality of optical fibers having light receiving ends disposed coaxially with respect to said light emitting ends.

13. Photoelectric scanner for scanning a transparent master according to claim 12 wherein said light conducting means further comprises:
- a circular disk having at least one hole therein;
- a third plurality of optical fibers having light emitting ends for guiding light from said light source to said disk; and
- said first plurality of optical fibers having light receiving ends, wherein the light emitting ends of said third plurality of optical fibers and the light receiving ends of said first plurality of optical fibers are located on opposite sides of said disk and are coaxial relative to each other.

* * * * *